US012080133B1

(12) United States Patent
Huxley et al.

(10) Patent No.: US 12,080,133 B1
(45) Date of Patent: Sep. 3, 2024

(54) SYSTEMS AND METHODS FOR MULTI-HAND CARD GAME

(71) Applicant: DK Crown Holdings Inc., Boston, MA (US)

(72) Inventors: Justin Robert Huxley, Las Vegas, NV (US); Kyle Morris, Las Vegas, NV (US); Mary Thai, Henderson, NV (US); Charles Raymond Mousseau, Winnipeg (CA)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/507,551

(22) Filed: Nov. 13, 2023

(51) Int. Cl.
*G07F 17/32* (2006.01)

(52) U.S. Cl.
CPC ...... *G07F 17/3293* (2013.01); *G07F 17/3211* (2013.01); *G07F 17/3262* (2013.01); *G07F 17/3267* (2013.01)

(58) Field of Classification Search
CPC ............. G07F 17/3293; G07F 17/3211; G07F 17/3262; G07F 17/3267
See application file for complete search history.

(56) References Cited

U.S. PATENT DOCUMENTS 11,694,522 B2 * 7/2023 Moody ............... G07F 17/3293 463/13
2022/0110673 A1 * 4/2022 Boronyak .......... A61B 18/1445
2022/0392303 A1 * 12/2022 Lamb .................. G07F 17/3227
2022/0415127 A1 * 12/2022 Morris ................ G07F 17/3293

* cited by examiner

*Primary Examiner* — Ronald Laneau
(74) *Attorney, Agent, or Firm* — Foley & Lardner LLP

(57) ABSTRACT

Described herein are gaming systems and methods for providing multi-hand card games. A data processing system can receive a wager for a play of a multi-hand card game and present a graphical user interface having multiple hands. The graphical user interface can indicate a respective set of cards for each hand. The data processing system can determine, based on the respective set of cards for each hand, whether a hand satisfies a lock condition or an unlock condition. The data processing system can receive input to advance the play of the card game. The data processing system can update the graphical user interface according to the command for each hand satisfying the unlock condition. Finally, the data processing system can adjust the credit balance according to the player's multiple hands and the dealer's hand.

20 Claims, 9 Drawing Sheets

100B

SYSTEMS AND METHODS FOR MULTI-HAND CARD GAME

BACKGROUND

Gaming machines or devices, such as networked gaming devices, can provide awards as a result of gaming events. Players generally place wagers to activate a game and can receive an award when a winning condition is met. However, it can be challenging to provide engaging interactive gaming content.

SUMMARY

It is therefore advantageous for a system to provide additional engagement features in interactive gaming content, such as the inclusion of multiple hands in a card game. Conventional interactive gaming content often focuses on single-player experiences and does not offer the option for players to engage with multiple hands simultaneously. Moreover, the incorporation of randomly generated bonus conditions, such as achieving a Blackjack or a Six Card Charlie, adds an element of additional award opportunities. Furthermore, cloud computing allows for distributed provisioning and processing of interactive gaming features across many player devices, thereby providing improved performance when compared to other implementations. Thus, the systems and methods of this technical solution provide a technical improvement to player engagement devices by providing additional engagement features not utilized in conventional gaming systems.

At least one aspect of the present disclosure is directed to a gaming system. The gaming system can include one or more processors coupled to memory. The one or more processors may receive a wager corresponding to a play of a card game. In response to the wager, the one or more processors may cause the presentation of a graphical user interface. Further, the graphical user interface includes a plurality of hands for the play of the card game, where each hand of the plurality of hands includes a respective first set of cards. The one or more processors may determine, based on the respective first set of cards of each hand of the plurality of hands, that a first hand of the plurality of hands satisfies a lock condition, and that a second hand of the plurality of hands satisfies an unlock condition. The one or more processors may receive an input of a command to advance the play of the card game. The one or more processors may update the graphical user interface according to the command for each hand of the plurality of hands satisfying the unlock condition. Additionally, the one or more processors may adjust a credit balance according to the plurality of hands and a dealer hand.

In some implementations, the one or more processors may evenly distribute the wager across each hand of the plurality of hands.

In some implementations, the one or more processors may determine that the first hand of the plurality of hands satisfies the lock condition when the total value of the respective first set of cards of the first hand satisfies a threshold.

In some implementations, the one or more processors may receive a command to advance the play of the card game, such as a hit command or a double down command. The processors may update each hand of the plurality of hands that satisfies the unlock condition by adding an additional card to the respective hand in response to the hit command or the double down command.

In some implementations, the one or more processors may determine that the second hand satisfies the lock condition in response to updating the second hand.

In some implementations, the one or more processors may restrict the update of each hand of the plurality of hands that satisfies the lock condition to prevent the inclusion of the respective additional card.

In some implementations, the one or more processors may respond to the double down command by doubling a respective portion of the wager assigned to each hand of the plurality of hands that satisfies the unlock condition. The one or more processors may update each hand of the plurality of hands that satisfies the unlock condition to include a respective additional card.

In some implementations, the one or more processors may determine if the total value of the respective first set of cards in at least one hand of the plurality of hands is equal to a predetermined threshold. The one or more processors may adjust the credit balance accordingly in response to this determination.

In some implementations, the one or more processors may determine if at least one hand of the plurality of hands satisfies a bonus condition. This determination can be made based on the number of cards in the hand meeting a predetermined number requirement and the total value of the cards in the hand not exceeding a predetermined threshold. If the bonus condition is satisfied, the one or more processors may adjust the credit balance accordingly.

In some implementations, the one or more processors may adjust the credit balance based on a respective portion of the wager assigned to each hand of the plurality of hands that satisfies a win condition.

At least one aspect of the present disclosure is directed to a method of gaming system. The method can include receiving a wager corresponding to a play of a card game. The method can further include causing the presentation of a graphical user interface comprising a plurality of hands for the play of the card game, where each hand of the plurality of hands comprises a respective first set of cards. Additionally, the method can include determining, based on the respective first set of cards of each hand of the plurality of hands, that a first hand of the plurality of hands satisfies a lock condition, and that a second hand of the plurality of hands satisfies an unlock condition. The method can then include receiving an input of a command to advance the play of the card game and update the graphical user interface according to the command for each unlocked hand of the plurality of hands. Finally, the method can include adjusting a credit balance according to the plurality of hands and a dealer hand.

The method can include distributing the wager across each hand of the plurality of hands.

The method can include determining that the first hand of the plurality of hands satisfies the lock condition based on a total value of the respective first set of cards of the first hand satisfying a predetermined threshold.

The method can include updating each hand of the plurality of hands that satisfies the unlock condition to include an additional card in response to receiving a hit command or a double down command as the command to advance the play of the card game.

The method can include determining that the second hand satisfies the lock condition in response to updating the second hand.

The method can include restricting each hand of the plurality of hands that satisfies the lock condition from being updated to include the respective additional card.

The method can include doubling a respective portion of the wager assigned to each hand of the plurality of hands that satisfies the unlock condition in response to a double down command. The method can further include updating each hand of the plurality of hands that satisfies the unlock condition to include a respective additional card.

The method can include determining that a total value of the respective first set of cards of at least one hand of the plurality of hands is equal to a predetermined threshold. The method can include adjusting the credit balance further in response to determining that the total value of the respective first set of cards of the at least one hand is equal to the predetermined threshold.

The method can include determining, in response to a number of cards in the at least one hand satisfying a predetermined number and a total value of the cards of the at least one hand not exceeding a predetermined threshold, that at least one hand of the plurality of hands satisfies a bonus condition. The method can include adjusting the credit balance further in response to determining that the bonus condition is satisfied.

The method can include adjusting the credit balance based on a respective portion of the wager assigned to each hand of the plurality of hands that satisfies a win condition of the play of the card game.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

The techniques described herein include features and functionalities to enhance the player experience in interactive games. These features may include but are not limited to gameplay mechanics, visual and audio elements, intuitive user interfaces, dynamic game environments, and reward systems. The techniques can be applied to various game genres such as action, adventure, strategy, cards, puzzle, or simulation games, among others. Moreover, the techniques discussed herein allow for the integration of multiplayer capabilities to allow players to engage in collaborative or competitive gameplay experiences with others across various platforms.

Figure 1A:
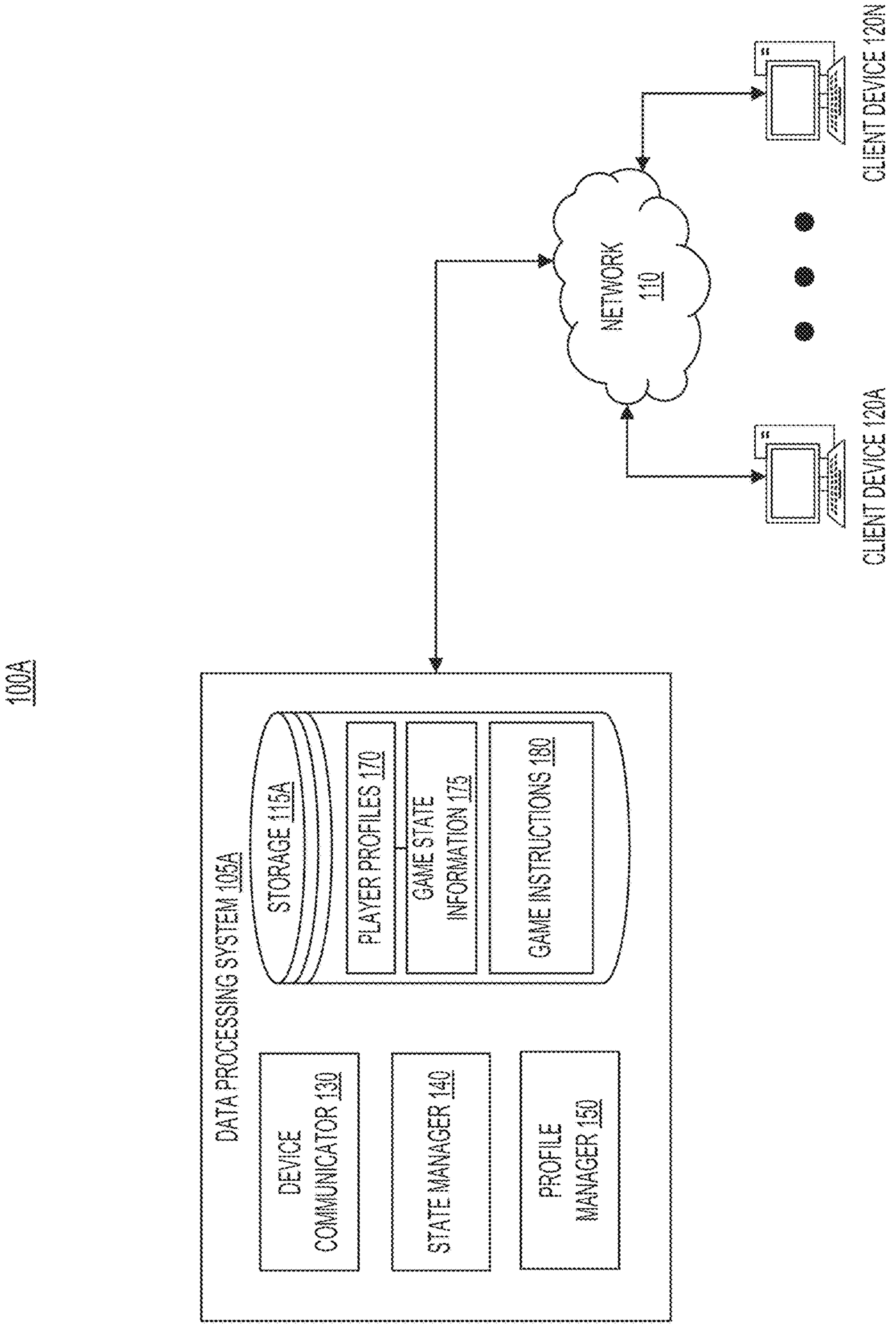
FIG. 1A illustrates a block diagram of an example system for providing gaming system functionalities in a client-server configuration, in accordance with one or more implementations.

Referring to FIG. 1A, depicted is a block diagram of an example system 100A for providing gaming system functionalities, in accordance with one or more implementations. In FIG. 1A, the system 100A can include at least one data processing system 105A, at least one network 110, and one or more client devices 120A-120N (sometimes generally referred to as client device(s) 120).

In FIG. 1A, the data processing system 105A can include at least one device communicator 130, at least one state manager 140, at least one profile manager 150, and at least one storage 115A. The storage 115A can include one or more player profiles 170, game state information 175, and one or more game instructions 180.

Figure 4:
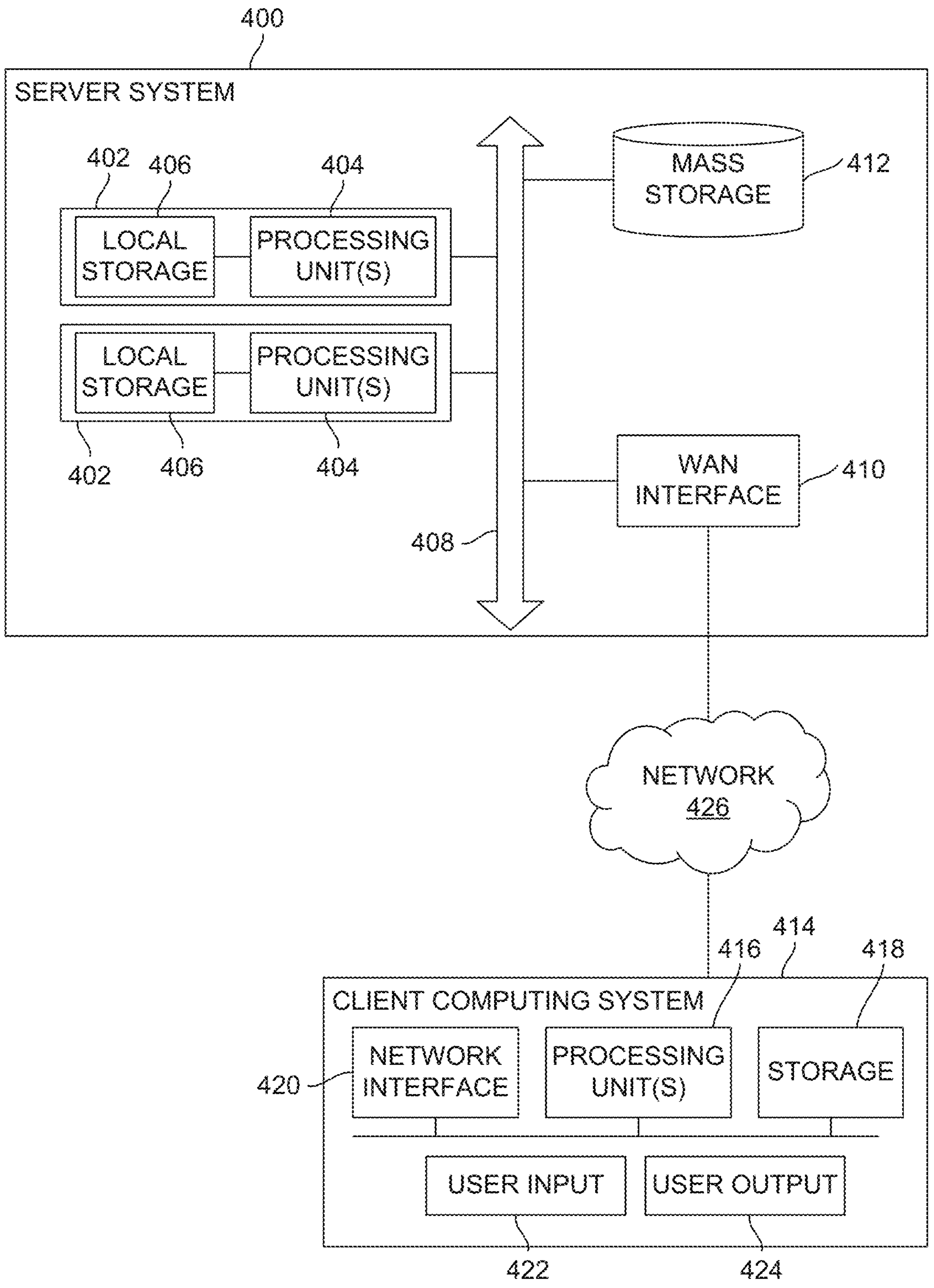
FIG. 4 illustrates a block diagram of a server system and a client computer system in accordance with an illustrative implementation.

Each of the components (e.g., the data processing system 105A, the network 110, the client devices 120, etc.) of the system 100A can be implemented using the hardware components or a combination of software with the hardware components of a computing system, such as the server 400 or the client computing system 414 described in connection with FIG. 4, or any other computing system described herein.

The data processing system 105A can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105A can include one or more computing devices or servers that can perform various functions as described herein. The data processing system 105A can include any or all of the components and perform any or all of the functions of a server system 400 described herein in conjunction with FIG. 4.

The network 110 can include computer networks such as the Internet, local, wide, metro or other area networks, intranets, satellite networks, other computer networks such as voice or data mobile phone communication networks, and combinations thereof. The data processing system 105A of the system 100A can communicate via the network 110, for example with one or more client devices 120. The network 110 may be any form of computer network that can relay information between the data processing system 105A, the one or more client devices 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks.

The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 105A, the one or more client devices 120, the server system 400, the client computing system 414, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105A, the one or more client devices 120, the server system 400, the client computing system 414, etc.) may also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 120 can include one or more computing devices or servers that can perform various functions as described herein. The one or more client devices 120 can include any or all of the components and perform any or all of the functions of the client computing system 414 described herein in conjunction with FIG. 4.

Each client device 120 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 120 can be implemented using hardware or a combination of software and hardware. Each client device 120 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, the display can include a touch screen display, which can receive interactions from a player. The interactions can result in interaction data, which can be stored and transmitted by the processing circuitry of the client device 120. The interaction data can include, for example, interaction coordinates, an interaction type (e.g., click, swipe, scroll, tap, etc.), and an indication of an actionable object with which the interaction occurred. Each client device 120 can include an input device that enables a player to interact with and/or select one or more actionable objects as described herein. For example, a touchscreen display can enable interaction with one or more visual indications provided through the display of each mobile device 120, and responsive to an interaction (e.g., select, click-on, touch, hover), the client device 120 can generate an indication identifying a player input and/or selection of a wager, an in-game event, or an indication to participate in a bonus event, among others.

Each client device 120 can include a device identifier, which can be specific to each respective client device 120. The device identifier can include a script, code, label, or marker that identifies a particular client device 120. In some implementations, the device identifier can include a string or plurality of numbers, letters, characters or any combination numbers, letters, and characters. In some implementations, each client device 120 can have a unique device identifier. Each client device 120 can include a client application, which can be a gaming application that communicates with the data processing system 105A to play games, as described herein. The client application can include an application executing on each client device 120 or provided to the client device 120 by the gaming system.

The application can include a web application, a server application, a resource, a desktop, or a file. In some implementations, the application can include a local application (e.g., local to a client device 120), hosted application, Software as a Service (SaaS) application, virtual application, mobile application, and other forms of content. In some implementations, the application can include or correspond to applications provided by remote servers or third-party servers. In some implementations, the application can access the player profiles 170, the game state information 175, or the game instructions 180, stored and maintained at the storage 115A, and generate one or more actionable objects, such as the actionable objects described herein below in connection with FIGS. 2A-2E, to a player through a client device 120. Such actionable objects can include player-selectable hyperlinks, buttons, graphics, videos, images, or other application features that generate a signal that is processed by the application executing on the respective client device 120.

In some implementations, one or more client devices 120 can establish one or more communication sessions with the data processing system 105A. The one or more communication sessions can each include a channel or connection between the data processing system 105A and the one or more client devices 120. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. The client devices 120 can each use the communication session established with the data processing system 105A to carry out any of the functionalities described herein. For example, the application executing on a client device 120 can perform any of the client-side operations described herein, including displaying any of the user interfaces shown in FIGS. 2A-2E, or any other types of user interfaces described herein.

Each of the client devices 120 can be computing devices configured to communicate via the network 110 to access information resources, such as web pages via a web browser, or application resources via a native application executing on a client device 120. When accessing information resources, the client device can execute instructions (e.g., embedded in the native applications, in the information resources, etc.) that cause the client devices to display gaming application interfaces, such as the user interface described herein below in conjunction with FIGS. 2A-2E. The gaming application interfaces can be, for example, application interfaces that present different types of casino games, or other types of interactive video games. In general, video games include content (e.g., images, video, animations, graphics, audio, etc.) that is presented to a player via the input/output interfaces of a client device 120.

In response to interaction with user interface elements, the client devices 120 can transmit information, such as player profile information (e.g., changing player profile parameters, changing login information, any information stored in a player profile 170, etc.), interaction information, selections of wager amounts, selections of gaming participation events, or other signals to the data processing system 105A. In some implementations, a client device 120 can transmit a request to initiate a gaming session, and requests for additional gameplay features during a gaming session. The request can include, for example, a request to play a particular game (e.g., can include a game identifier, etc.). The request can be a hypertext transfer protocol (HTTP or HTTPS) request message, a file transfer protocol message, an email message, a text message, or any other type of message that can be transmitted via the network 110.

The data processing system 105A is shown as including the storage 115A. The storage 115A can be a computer-readable memory that can store or maintain any of the information described herein. The storage 115A can maintain one or more data structures, which may contain, index, or otherwise store each of the values, pluralities, sets, variables, vectors, numbers, or thresholds described herein. The storage 115A can be accessed using one or more memory addresses, index values, or identifiers of any item, structure, or region maintained in the storage 115A. The storage 115A can be accessed by the components of the data processing system 105A, or any other computing device described herein, via the network 110. In some implementations, the storage 115A can be internal to the data processing system 105A. In some implementations, the storage 115A can exist external to the data processing system 105A and may be accessed via the network 110. For example, the storage 115A may be distributed across many different computer systems (e.g., a cloud computing system) or storage elements and may be accessed via the network 110 or a suitable computer bus interface.

The data processing system 105A can store, in one or more regions of the memory of the data processing system 105A, or in the storage 115A, the results of any or all computations, determinations, selections, identifications, generations, constructions, or calculations in one or more data structures indexed or identified with appropriate values. Any or all values stored in the storage 115A may be accessed by any computing device described herein, such as the data processing system 105A, to perform any of the functionalities or functions described herein. In implementations where the storage 115A forms a part of a cloud computing system, the storage 115A can be a distributed storage medium in a cloud computing system and can be accessed by any of the components of the data processing system 105A, by the one or more client devices 120 (e.g., via the user interface similar to that depicted in FIGS. 2A-2E, etc.), or any other computing devices described herein.

The storage 115A can store one or more player profiles 170 associated with a user (referred to herein as a "player") of a client device 120. A player profile 170 of a player can be a user profile that includes information about the player and information about one or more of the client devices 120 used to access the data processing system 105A using the player profile 170. For example, identifiers of the player profile 170 can be used to access the functionality of the data processing system 105A (e.g., by logging into the data processing system 105A via one or more web-based interfaces). The identifiers can include a username, a password, an e-mail address, a phone number, a personal identification number (PIN), a secret code-word, device identifiers for use in a two-factor authentication technique, among others. The player profile 170 can store information about wagers, games, and gaming events that are performed by the player via the data processing system 105A. The player profile 170 can store a credit balance, wager information or side wager information (e.g., an amount of a wager/side wager, a timestamp associated with a wager/side wager, information about gaming conditions or game state information that resulted in a side wager, a client device identifier of a client device that was used to place the wager/side wager, etc.). The player profile 170 can store information about a client device used to access the data processing system 105A such as an IP address, a MAC address, a GUID, a player profile name (e.g., the name of a user of the client device 120, etc.), device name, among others. In some implementations, the player profile 170 can be created by the data processing system 105A in response to the player profile creation request transmitted by a client device 120. The player profile creation request can include any of the player profile information described herein.

The storage 115A can store or maintain game state information 175 associated with each of the one or more player profiles 170, for example, in one or more data structures. The game state information 175 can include information for games previously or currently played or otherwise accessed by a client device 120 using a corresponding player profile 170. In some implementations, a client device 120 accessing the data processing system 105A may not be associated with a player profile 170. In such implementations, the data processing system 105A can automatically create a player profile 170 using an identifier of the client device 120 provided by the client device 120. The game state information 175 can include information about previous wagers, side wagers, hands, actions, interactions, or other data provided by the client device 120 during the play of a game provided by the data processing system 105A. As described in further detail herein, the state manager 140 can maintain (e.g., store, update, etc.), in corresponding game stat information 175, a respective game state of games as they are being played for multiple players accessing the data processing system 105A. The game state information 175 can include one or more data structures that include any information related to a game state, such as current cards held by a player (e.g., in a Blackjack game, poker game, or another card game, etc.), wager information, information about whether the player has indicated a desire to participate in additional bonus award opportunities, or other game state data described herein.

The game state information 175 can include turn information (e.g., which user has the current turn, how many game turns have elapsed, etc.) for one or more games provided via the data processing system 105A. In some implementations, information used to update the game state information 175 can be received as a play of the game occurs (e.g., as the play is processed by the data processing system 105A according to the game instructions, etc.). The game state information 175 can include options that a player may take at each portion of a game, and any actions (e.g., interactions, pausing/waiting for a particular duration at stored timestamps, etc.) the client device 120 takes in response to said options. In some implementations, if multiple hands are being controlled by a player via the client device 120 for a single play of a card game (e.g., multiple hands for a single round of Blackjack, poker, or another card game, etc.), the game state information 175 can include game state information for each of the hands under control of the player. In addition, the game state information 175 can include information relating to the conditions of additional wagers.

In some implementations, the game state information 175 can include relevant information about each hand in a multi-hand card game. This includes information about the current cards in each hand, such as the cards in one or more player hands (e.g., in a multi-hand card game), and the cards in a dealer's hand, if any. The game state information 175 can also indicate the status of each hand, including whether it satisfies a locked or unlocked condition. For example, a hand is deemed to satisfy a locked condition when the total value of the respective set of cards in the hand satisfies a threshold value. Once this threshold value is satisfied, the hand is considered locked, thereby restricting the hand from further advancement, that is, the hand cannot receive any additional cards upon receiving a hit command. Conversely, a hand is in an unlocked condition if the hand fails to satisfy the lock condition because the total value of the respective set of cards in the hand fails to satisfy the threshold value. Unlike a hand in the locked condition, a hand in the unlocked condition can be further advanced, that is, the hand can receive additional cards upon receiving a hit command. Additionally, the game state information 175 may account for other game conditions, including the presence of a Blackjack (e.g., a hand with a value of 21) or a Six Card Charlie (e.g., a hand with six cards that has not exceeded 21 automatically wins).

The storage 115 can store or maintain game instructions 180. The game instructions 180 can include instructions to play various games (e.g., card games such as Blackjack, poker, rummy, craps, sic bo, Klondike, slot-machine games, roulette games, any other game, etc.). The game instructions 180 can specify one or more game events that occur in response to a particular game state. The game instructions can include instructions to play a game from start to finish, for example, by streaming gaming content to each of the client devices 120 that initiate play of a particular game, or by executing the game instructions and displaying content via a local display device. The game instructions 180 can be stored in one or more data structures that are indexed by a game name (e.g., Blackjack, poker, rummy, craps, sic bo, Klondike, any other game, etc.). The game instructions 180 can be processor executable instructions that cause the data processing system 105A to provide one or more games to a client device 120 via a communication session.

In some implementations, the game instructions 180 can include artificial intelligence models (e.g., machine learning models, neural network, decision trees, ruled-based lookup table, etc.) that cause the data processing system 105A to play an opposing entity to a player of one of the games in the game instructions 180. For example, the artificial intelligence model can provide a simulated dealer in a Blackjack game, a simulated player in a poker game, or other simulated players, dealers, or game entities. In some implementations, the gaming instructions 180 can include game instructions that allow a play of a game to progress with multiple hands. For example, in a multi-hand card game, the game instructions 180 can include instructions that accommodate multiple hands being controlled by a single player.

The game instructions 180 can include, or may include instructions for generating, odds information, which can be stored as probability values of certain in-game events occurring. The odds information may further define one or more probability distributions that may be sampled to determine an outcome of one or more events in the game according to the game instructions 180. In some implementations, the odds information may be altered based on actions taken by the player, or the odds information can correspond to the likelihood of one or more outcomes (e.g., an expected value of player loss, an expected value of player win, etc.). For example, in a slot machine, the odds of getting a certain combination of symbols determine how much money the player wins if they get that combination. The paytable defines the rewards or winnings associated with specific events or combinations, and the odds information provides the underlying probabilities for those events. In this manner, the odds information and the paytable are closely related because the payouts are based on the odds of getting different outcomes. Similarly, in some implementations, the odds information may be used to determine the likelihood of one or more particular expected outcomes.

The game instructions 180 can also cause the game state information 175 for a game to be updated as the game is played via a client device 120. In some implementations, the game instructions can update the odds information in response to an indication (e.g., as stored in the game state information 175, etc.) to participate in an additional bonus opportunity, such as a bonus play of the game, a separate bonus game, or a side wager or insurance bet that may result in an additional or alternative award. In some implementations where a player controls multiple hands in a multi-hand card game, the game instructions 180 can update the game state in the game state information 175 for each hand controlled by the player during the play of the game, for example, in response to player actions at the client device 120.

In some implementations where the game instructions 180 provide instructions for a game that implements a side wager, the game instructions 180 can specify the conditions under which the player is able to place the side wager, the conditions under which the player is to be awarded with awards according to a side wager when a corresponding side wager condition is met (e.g., at game termination, on player win, on player loss, etc.). Each of the components of the data processing system 105A can access, update, or modify the player profiles 170, the game state information 175, or the game instructions 180, to carry out functionalities.

In some implementations, the game instructions 180 provide instructions for a multi-hand card game. In a brief overview of example game instructions 180, upon receiving a wager from a player, the data processing system 105A can present a graphical user interface that includes multiple hands for the play of the game. Each hand in the graphical user interface includes a respective set of cards. The data processing system 105A evaluates the cards in each hand and determines if a hand satisfies a lock condition or an unlock condition. The lock condition is satisfied for a hand when the total value of the cards in that hand reaches or exceeds a threshold. This indicates that further updates or modifications are not allowed for that hand (e.g., cards may not be added to the hand). A hand satisfies an unlock condition when the total value of the cards in that hand is below the threshold. Hands that satisfy the unlock condition can be updated or modified. For example, the player can provide input to add additional cards to the hand.

The player interacts with the graphical user interface and provides input for all hands simultaneously, such as hitting (requesting an additional card), staying (refraining from taking more cards) or doubling down (doubling the wager and receiving one more card). In some implementations, the player can interact with the graphical user interface to individually (e.g., selectively) update hands that are unlocked (e.g., that satisfy the unlock condition as described in further detail herein). However, hands satisfying the lock condition are restricted from being updated. In an example where hands are all updated based on the player's input, the data processing system 105A updates each hand that satisfies the unlock condition and presents the updates in the graphical user interface. Furthering this example, in response to a hit command from the player, the hands satisfying the unlock condition can be modified to each include an additional card. Similarly, in response to a double down command from the player, the data processing system 105A doubles the wager and deals one more card to each qualifying hand. In response to a stand command from the player, the hands remain unchanged. In addition to the basic commands, the player may also be able to trigger bonus conditions, such as Blackjack (e.g., a hand with a value of 21) or Six Card Charlie (e.g., a hand with six cards that has not exceeded 21 automatically wins). These bonus conditions can result in additional payouts or other rewards. Finally, the data processing system determines the outcomes, including wins or losses, and adjusts the player's credit balance accordingly.

Referring now to the operations of the data processing system 105A, the device communicator 130 can establish a game session with a client device in response to a request from a client device. Establishing the game session may include generating game state information 175 for the player profile 170 used to access the data processing system 105A to initiate the play of the game. The request to establish a game session may include a request to play a game, which may be received in one or more messages from an application executing on the client device 120. The message, or request, can indicate that a player intends to play a game provided by the data processing system 105A. The message can include an indication of a player profile 170 with which to use for the functionalities related to the game (e.g., placing wagers using earned credits, purchasing additional credits, etc.).

The message can include an identifier of a particular game to play. In some implementations, the device communicator 130 can provide the client device 120 with instructions to display one or more games to play in a list, allowing the player to select a game from the list. In response to an interaction indicating a selection, the client device 120 can transmit a signal identifying a game to the data processing system 105A. Using the game selection, the data processing system 105A can communicate a user interface for the game generated according to the game instructions 180 for the game and the game state information 175 for the game session. Such graphical user interfaces are shown in FIGS. 2A-2E.

The selected game can be, for example, a card-based game, which can include (but is not limited to) poker, Blackjack, rummy, reel jack, hart-race hold'em, or other similar games involving playing cards. In some implementations, the game can be a dice-based game, which can include (but is not limited to) a game of craps, sic bo, or Klondike. The games provided by the data processing system 105A can be multiple play games, which allow a player to play multiple hands simultaneously against a dealer.

A play of a game can be a single "round" or play-through of a game to a termination condition (e.g., a condition after which the player has won or lost the wagers for each simultaneous hand, etc.). To initiate a play of the game, or during a play of the game, the device communicator 130 can receive one or more wagers from the client device 120 (e.g., in response to corresponding user interface elements presented at the client device 120, as described herein). The wager(s) may specify a wager amount. The wager amount provided by the client device 120 can be a specified amount of credits, such as 1, 5, 25, 100, 500, or 1000 credits. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game.

The client device 120 (or an application executing on the client device 120) can receive data relating to the requested game from the device communicator 130. The data relating to the requested game can include or may be generated based on game state information 175, which can be maintained by the state manager 140, as described herein. The device communicator 130 may determine updated information to provide to the client device 120 based on the game state information 175 for the game, which is initialized and updated by the state manager 140.

The state manager 140 can update and maintain the game state information 175. The game state information 175 may refer to the current state of a game, which includes various information such as the cards held by each player, the bets placed, and the outcome of previous rounds. The state manager 140 can update the game state information 175 based on several factors, including player interactions, random values, and the game instructions 180. For example, if a player provides input to advance a play of the game, such as placing a wager, or providing another type of interaction, the state manager 140 can update the game state information 175 to reflect that action. Similarly, if the game involves elements of randomness, such as the dealing of cards, the state manager 140 can handle the generation and distribution of those random values to update the game state information 175 accordingly.

The profile manager 150 can create, modify, or delete player profiles 170 stored within the storage 115A. The profile manager 150 can handle the storage and organization of player information, including account details, preferences, and gaming history, among others. The profile manager 150 can generate profile information based on data received from the client devices 120. This allows the profile manager 150 to capture activity across different gaming applications and different devices, and store records of that activity in the player profile 170. The profile manager 150 can provide gaming statistics (e.g., historical game outcomes), and game progress to a requesting client device 120.

The profile manager 150 can update credit balances, game statistics, and other relevant information based on the outcomes of games played by a client device 120. The profile manager 150 receives data about game results from the client devices 120 or the state manager 140 and uses this information to make necessary adjustments to the player profiles 170. For example, if a player wins a game of Blackjack with a $10 wager, the profile manager 150 would increase their credit balance by $15 (the amount of the wager plus the win). Similarly, the profile manager 150 can record game statistics such as the number of wins, losses, and ties, as well as the player's average bet size, win percentage, and longest winning streak. This allows players to track their progress and review their gaming history. For example, a player could see that they have won 60% of their reel jack games and have an average bet size of $10. This information could help the player make better decisions about how to bet in the future.

Figure 1B:
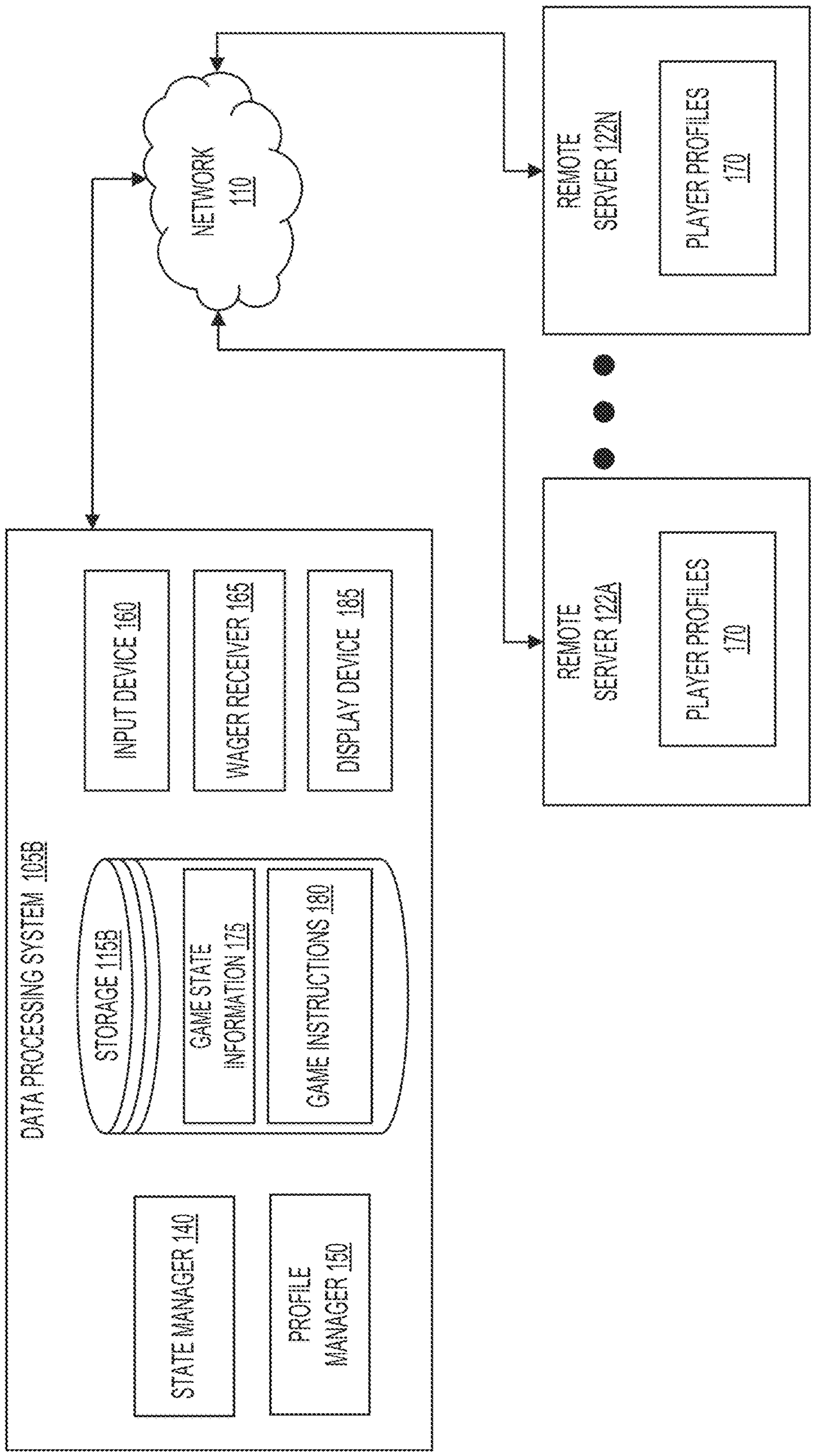
FIG. 1B illustrates a block diagram of an example system depicting a data processing system that provides gaming functionality using locally-executed game instructions, in accordance with one or more implementations.

Referring now to FIG. 1B, depicted is a block diagram of an example system 100B comprising at least one data processing system 105B, a network 110, and one or more remote servers 122A-122N (also generally referred to herein as a "remote computing system 122"). Various components of the system 100B shown in FIG. 1B may be similar to, and include any of the structure and functionality of, the system 100A of FIG. 1A. For example, the network 110 shown in FIG. 1B is similar to the network 110 in FIG. 1A, differing only in its role of facilitating the connection between the data processing system 105B and the remote computing system 122. Additionally, the components of the data processing system 105B may include some or all of the structure and functionality of their specific counterparts in FIG. 1A. For example, the data processing system 105B, similar to the implementation shown in FIG. 1A, includes a storage 115B, a state manager 140, and a profile manager 150. The data processing system 105B in FIG. 1B may further include one or more of an input device 160, a wager receiver 165, and a display device 185. The storage 115B may be similar in structure and functionality to the storage 115A and may store the game state information 175 and one or more game instructions 180.

The configuration shown in FIG. 1B may be used to implement a local gaming device, which may provide games locally without necessarily communicating with one or more remote servers 122A-122N. In one implementation, the data processing system 105B of the system 100B may implement a kiosk device, a portable gaming device, or a stationary gaming system. As shown, the data processing system 105B (or the components thereof) may communicate with one or more remote servers 122A-122N, for example, to access or update player profiles 170 maintained at the one or more remote servers 122A-122N.

The remote computing system 122 can securely store and provide access to player profiles 170 for games played on the data processing system 105B. In some implementations, the remote computing system 122 may include a file server, application server, web server, proxy server, appliance, network appliance, gateway, gateway server, virtualization server, deployment server, SSL VPN server, or firewall. The remote servers 122A-122N may store, or otherwise maintain, player profiles 170, which may be created, updated, or deleted based on communications with the data processing system 105B.

The data processing system 105B can include an input device 160, which can implement an interface between a player and the data processing system 105B. Players can interact with the input device 160 to provide commands to control the functionality of the data processing system 105B, for example, to play one or more games as described herein. In some implementations, the input device 160 can include but is not limited to one or more physical buttons (such as a slot machine arm), a keyboard, a mouse, a touchscreen, a virtual input interface, tokens, chips, among other input devices. Interactions provided via the input device 160 allow a player to perform graphical user interface functionality, such as navigating menus, making selections to trigger game events, entering commands, or otherwise controlling play of one or more games provided via the data processing system 105B.

The data processing system 105B includes a wager receiver 165, which can receive and process wagers made by players. The wager receiver 165 may include a coin slot where players can insert coins or tokens as part of wagers. In some implementations, the wager receiver 165 may also include a card reader that allows players to use electronic cards or tickets for placing bets. Furthermore, the wager receiver 165 may include a touchscreen, allowing players to make their wagers by directly interacting with the screen. The aforementioned examples for the wager receiver 165 are not exhaustive and may include other suitable components or technologies for receiving and processing wagers, such as near-field communication (NFC) or wireless communication with a mobile device.

The wager receiver 165 allows players to place bets or wagers for the various games provided by the data processing system 105B. Upon receiving a wager, the wager receiver 165 may provide a signal to the components of the data processing system 105B to initiate a game, initiate a play of a game, or advance a game state of the game, among other actions. In some implementations, wager receiver 165 can determine whether a received wager conforms to the game's requirements and rules (e.g., appropriate amount, type of bet, etc.). If any issues are detected, such as an invalid bet amount or an unsupported bet type, the data processing system 105B may prompt the player to revise their wager. Additionally, the data processing system 105B may check if the player has sufficient funds or credits to place the bet. The data processing system 105B reviews the player's account balance or credit balance through the profile manager 150 to make sure that they have the necessary funds available. Furthermore, the data processing system 105B applies any relevant game-specific restrictions to the wager. These restrictions can include minimum or maximum bet limits, specific betting options, or combinations.

The data processing system 105B includes a display device 185, which serves as the visual interface for players. The display device 185, integrated within the data processing system 105B, can take various forms, such as a monitor, screen, or any other suitable visual output mechanism. The display device 185 may include a touchscreen interface. Touchscreens are becoming increasingly popular as they offer a more intuitive way to interact with devices. Touchscreens may include displays that present graphical user interfaces, which may include icons, buttons, and other graphical elements that can be interacted with by touching the screen. For example, as shown in FIGS. 2A-2E, the graphical user interface can display the game graphics, interactive objects, and other relevant information that players need to interact with the data processing system 105B.

In some implementations, the data processing system 105B may transmit game-related information to the remote computing system 122 when the player requests a game or when the game state changes. This data includes game state information 175, which is managed by the state manager 140 within the data processing system 105B. Updated game state information 175 that reflects the changes occurring during the play of a game may be synchronized or otherwise provided to the remote servers 122A-122N.

The data processing system 105B can include a profile manager 150 that can provide messages to update one or more player profiles 170 stored within the remote computing system 122. The profile manager 150 can retrieve and store player-specific data, including preferences, gaming history, achievements, content they engage with, preferred wagering amounts across various games, and other relevant information, from the remote computing system 122.

As discussed above, the system 100B includes a remote computing system 122 that can store player profiles 170. The remote computing system 122 can allow the data processing system 105B, via the profile manager 150, to update player profiles 170 during or based on outcomes of games. For example, when a player interacts with the data processing system 105B, they can provide an identifier for their player profile 170 via the input device 160 or wager receiver 165. The data processing system 105B can then communicate with the remote computing system 122 to retrieve the relevant player profile information based on the identifier. The identifier of the player profile 170 could be a username, an email address, a phone number, or a social media handle, among others. Similarly, when changes occur in the player's profile, such as the outcomes of games, plays, or adjusting the credit balance of the player profile 170, etc., the profile manager 150 within the data processing system 105B updates the player profile 170. Subsequently, the data processing system 105B communicates these updates to the remote computing system 122.

Referring now to one example implementation of a multi-hand card game, upon receiving a wager, the data processing system 105A can cause the presentation of a graphical user interface with multiple hands. Each hand can be represented by a respective set of cards. Based on the respective set of cards in each hand, the data processing system 105A can determine whether each hand satisfies a lock condition or an unlock condition. The graphical user interface is updated to reflect the current state of the game, including cards in the player's hands, the dealer's hand, if any, and whether any hand satisfies the lock condition, the unlock condition, or a bonus condition. The player can continue to interact with the graphical user interface to advance the play of the game, providing commands such as hit commands, stand commands, or double down commands for one or more hands. Example graphical user interfaces showing an example implementation of a multi-hand card game are shown in FIGS. 2A-2E.

Figure 2A:
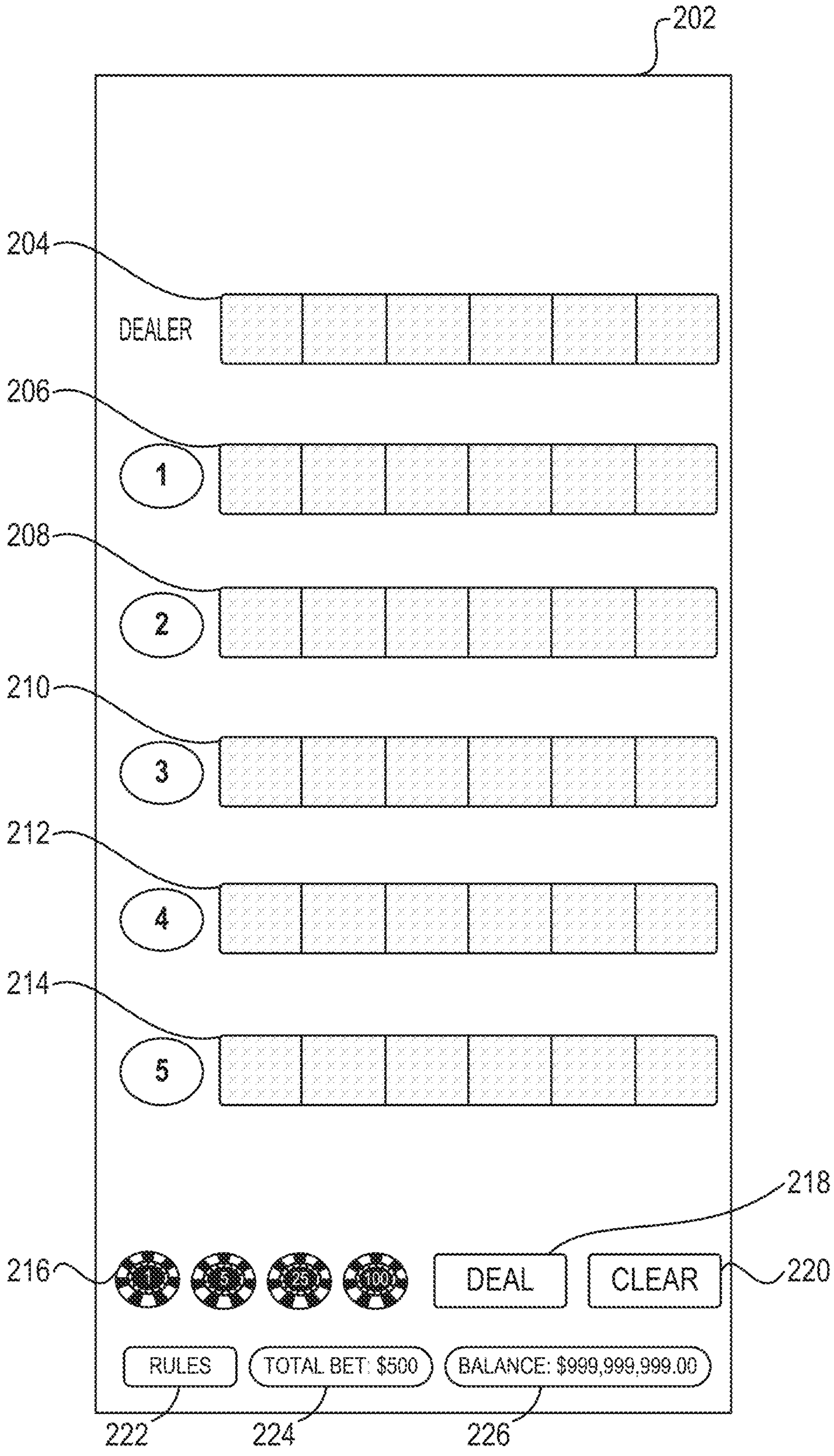
FIG. 2A illustrates a graphical user interface for a multi-hand card game, in accordance with one or more implementations.

Referring now to FIG. 2A in the context of the components described in connection with FIGS. 1A and 1B, a graphical user interface 202 is presented on a client device 120, for example, in response to a request for a multi-hand card game. As discussed above, the device communicator 130 facilitates communication between the client device 120 and the data processing system 105A, allowing players to interact with the graphical user interface 202 and transmit their actions to the data processing system 105A. As players engage with the graphical user interface 202, their actions, such as placing bets or initiating the game by interacting with a deal button 218, are captured and utilized to update the state of the game (e.g., in the game state information 175). The corresponding player profile 170 of the player may also be updated to reflect wager history, gameplay statistics, or credit balance changes resulting from one or more plays of the multi-hand card game.

As shown in FIG. 2A, the graphical user interface 202 displays a dealer hand 204 and five player card regions 206-214. The rules button 222 displayed on the graphical user interface 204 is a button that, when interacted with, causes the graphical user interface 202 to transition to a second interface showing a player how to play the multi-hand card game (e.g., listing gameplay instructions). The graphical user interface 202 shows interactive wager elements 216, which enable a player to specify a wager for a play of the game. In this example implementation, the wager is shown as separate chips with denominations of 1, 5, 25, and 100. However, it should be understood that any type of wagering interface may be utilized to place a wager for the game, including, for example, via the wager receiver 165. Furthermore, the graphical user interface 202 displays a clear button 220 that the player can interact with. In response to an interaction with the clear button 220, the data processing system 105A can remove or erase the wager that the player has entered. In some implementations, the graphical user interface 202 can be updated via the clear button 220 to reset all the selections made by a player to their default state. In this example, a player can interact with the interactive wager elements 216 of the graphical user interface 202 to place a wager prior to initiating a play of the game. In the provided example, the player can specify a single wager amount, which is evenly distributed across each hand. However, in some implementations, the player can specify a different wager amount for each hand. Subsequently, the wager information is transmitted from the client device 120 to the data processing system 105A. The player profile 170 is also updated with the wager information, for example, by subtracting the wager amount from a credit balance indicated in the player profile 170.

Once a wager has been placed, players can initiate the game by interacting with the deal button 218. This interaction causes the data processing system 105A to generate cards for presentation at the dealer card region 204 and each of the player card regions 206-214. As shown, the graphical user interface 202 is dynamically updated to show generated cards in the updated player card regions 206-214. In some implementations, and as shown in this example, the dealer hand region 204 and the player card regions 206-214 of graphical user interface 202 may resemble reels of a slot machine game, with each slot representing a card in a corresponding hand. The cards can be initially displayed face down within the slots, as shown in FIG. 2A. As the game progresses and the cards are dealt, the slots can dynamically animate, transitioning from a "no card" or "face down card" appearance to the generated card, as shown in FIGS. 2B-2E. Furthermore, the graphical user interface 202 may be dynamically updated to reflect any changes in the game state information 175. For example, when new cards are added to a player hand or a dealer hand, or when cards are discarded, the corresponding slots can be updated to visually represent these changes.

The total bet region 224 displays the wager amount for the play of the game specified by the player. The credit balance region 226 displays an amount of credits available for the player to wager on the game. The amount shown in the credit balance region 226 may be determined from a credit balance specified in the player profile 170 of the player. The total bet region 224 may be updated in response to interactions with the interactive wager elements 216. Wagers made on the play of the game can be subtracted from the credit balance of the player. Any changes to the credit balance can be reflected via dynamic updates to the credit balance region 226.

Figure 2B:
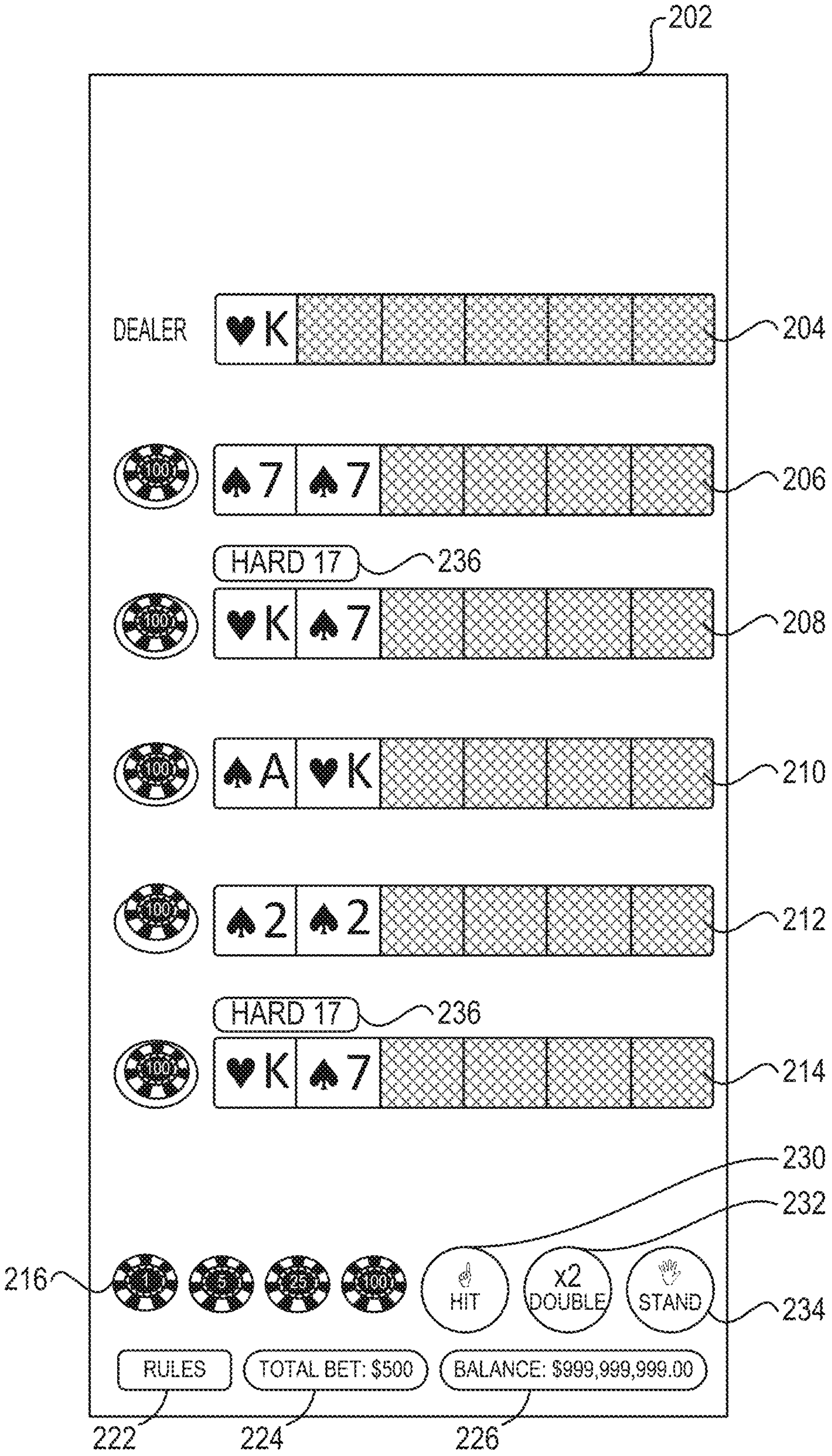
FIG. 2B illustrates a graphical user interface showing the hands of the multi-hand card game depicted in FIG. 2A, with one hand satisfying a lock condition, in accordance with one or more implementations.

Referring to FIG. 2B in the context of the components described in connection with FIGS. 1A and 1B, illustrated are the player card regions 206-214 on the graphical user interface 202 of a client device 120 as part of the multi-hand card game. Upon interacting with the deal button 218, the state manager 140 updates the game state to generate hands for the dealer and the player and displays these updates via the graphical user interface 202. As shown, the dealer card region 204 has been updated to include a King. The first card region 206 has been updated to include two sevens (7s). The second card region 208 has been updated to include a King and a 7. The third card region 210 has been updated to include an Ace and a King. The fourth card region 212 has been updated to include two twos (2s). The fifth card region 214 has been updated to include a King and a 7. The data processing system 105A, using the game state information 175, determines the value of cards shown in each player hand region 206-214 by determining the value of each card and summing the values to determine a total value of each hand. The value of a card may be identified by its rank and suit. For example, a number card (2-10) is worth its face value, a face card (Jack, Queen, King) is worth 10 points, and an Ace can be worth 1 or 11 points. The total value of a hand is the sum of the values of the cards in the hand. For example, a hand with a 7 and an 8 has a total value of 15. A hand with an Ace and a 5 can have a total value of 16 or 6, depending on whether the Ace is counted as 1 or 11.

The data processing system 105A determines the total value each hand shown in each player card regions 206-214 to determine if the hand satisfies a lock condition or an unlock condition. The lock condition is satisfied for a hand when the total value of the cards in that hand reaches or exceeds a threshold. In this example, the threshold value that causes a hand to satisfy the lock condition is seventeen, but any suitable value may be utilized. The threshold value may be a predetermined value, selected from a paytable or wager table according to a wager placed by the user, or selected by the player (e.g., via one or more graphical user interface elements) prior to generation of the player hands for the play of the game.

As shown, if a hand satisfies the lock condition, the graphical user interface 202 may be updated with an indicator 236 that shows the hand satisfies the lock condition. The indicator 236 may be positioned in the graphical user interface 202 proximate to the hand satisfying the lock condition. The graphical user interface 202 may be updated to show what type of lock condition the hand satisfied—for example, whether the hand has a total value or rank that satisfies a threshold, whether the hand satisfies a bonus condition, or the like. As shown, in this example, the indicator 236 shows that the hands in the player card regions 208 and 214 are each a "Hard 17," indicating that those hands have a total value equal to seventeen, which in this example is the threshold for which the lock condition is satisfied.

In some implementations, the player may have the ability to unlock a previously locked hand based on certain conditions. Multiple conditions may enable a player the opportunity to unlock a hand that is locked. One such condition can be if a player hand is updated to include a bonus card (e.g., in response to a hit command). In some implementations, a player may unlock a locked hand upon placing an additional wager corresponding specifically to that hand or corresponding to the play of the game (e.g., divided among each player hand). On the other hand, a hand satisfies an unlock condition when the total value of the cards in that hand is below a threshold, in this example having a total value that is less than seventeen. However, any suitable value may be used as the threshold.

Furthermore, in the graphical user interface displayed in FIG. 2B, additional interactive elements are presented that enable a variety of player actions to advance the game state of the multi-hand card game. For example, when a player interacts with the hit button 230, a new card can be generated for each of the unlocked hands (e.g., the player hands that satisfy the unlock condition). The graphical user interface 202 is updated to reflect the new card in each unlocked hand. When a player interacts with the stand button 234, no new cards are generated, and instead the dealer hand is updated until a termination condition for the play of the game occurs.

Players can also interact with a double-down button 232 to double the respective portion of the wager assigned to each hand that satisfies the unlock condition. When a player interacts with the double-down button 232, a new card is generated for each the unlocked players hands, and the graphical user interface 202 is updated to reflect the new card in each hand. For example, if a wager of $50 is placed and distributed evenly among five hands, each hand would have a partial wager of $10. Continuing this example, if the player interacts with the double-down button 232, the data processing system 105A can generate a new card for each unlocked hand, double the wager for each unlocked hand—making the respective wager for each unlocked hand $20. Each unlocked hand is then locked, regardless of whether the total value of the previously unlocked hand satisfied the threshold corresponding to the lock condition. If the total value of any hand that doesn't exceed a threshold corresponding to a loss and exceeds the total value of the final dealer hand, the player wins the respective hand, and gets a payout according to the doubled wager amount (e.g., $20).

Figure 2C:
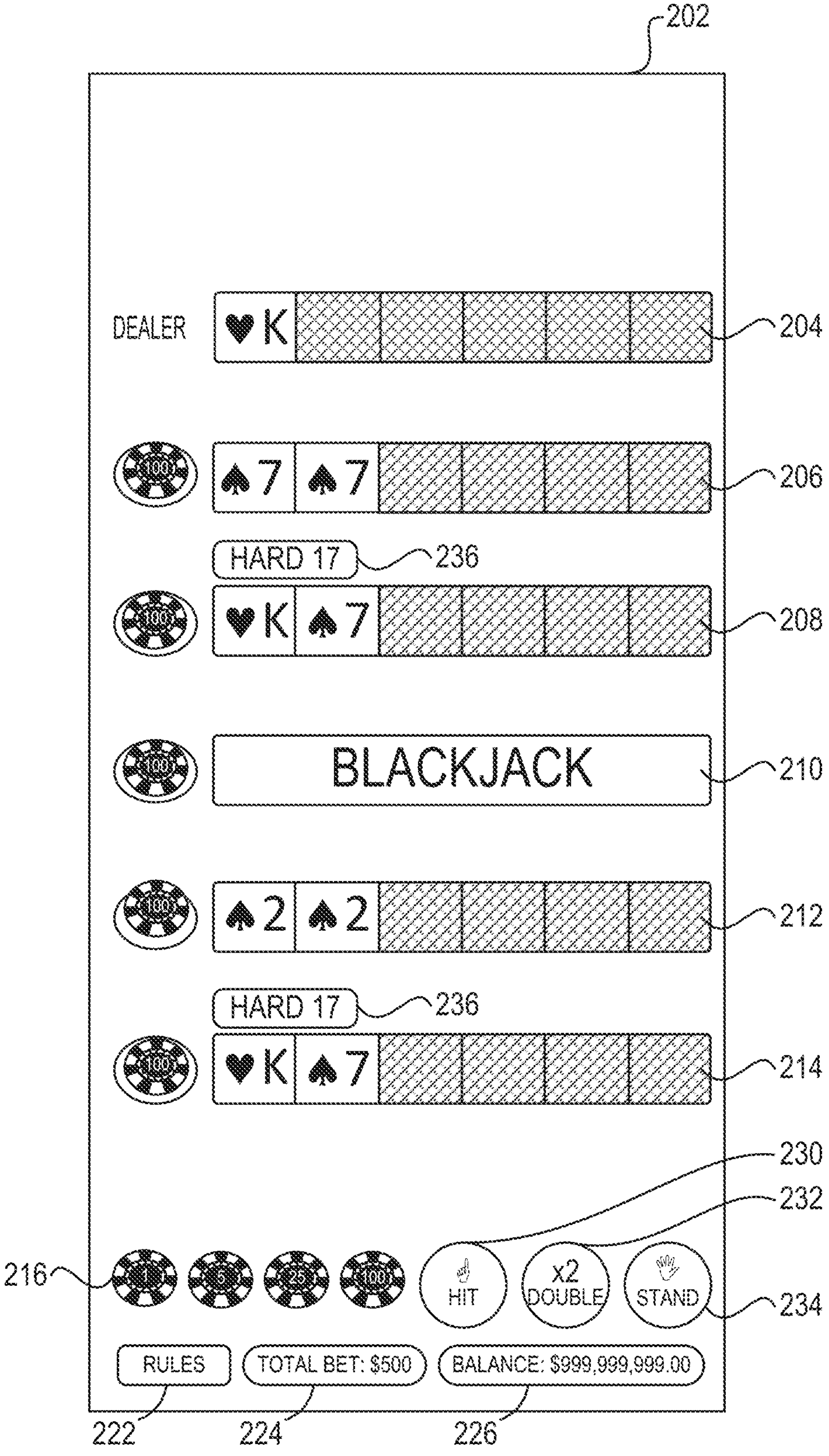
FIG. 2C illustrates a graphical user interface showing the hands of the multi-hand card game depicted in FIG. 2A, with one hand satisfying a Blackjack, in accordance with one or more implementations.

Referring to FIG. 2C in the context of the components described in connection with FIGS. 1A and 1B, the graphical user interface 202 is updated to reflect that the cards in the player card region 210 result in a Blackjack. A Blackjack is a hand that consists of an Ace and a 10-value card. As shown in FIG. 2B, the player card region 210 includes an Ace and a King, resulting in a total value of 21. The player card region 210 is now locked (e.g., satisfies the lock condition by satisfying a bonus condition). Upon identifying the Blackjack or that any other hand satisfies a bonus condition, the data processing system 105A implement specific game instructions 180 corresponding Blackjack or bonus condition. For example, the data processing system 105A may provide one or more bonus award amounts (e.g., by adjusting the credit balance accordingly) for any hand that satisfies a bonus condition. In some implementations, while the bonus condition applies to a specific bonus-qualifying hand, the award amounts added to the player's credit balance for any other winning hands that do not satisfy a bonus condition are calculated according to the game instructions 180 (e.g., via a paytable identifying award amounts for normal play).

Figure 2D:
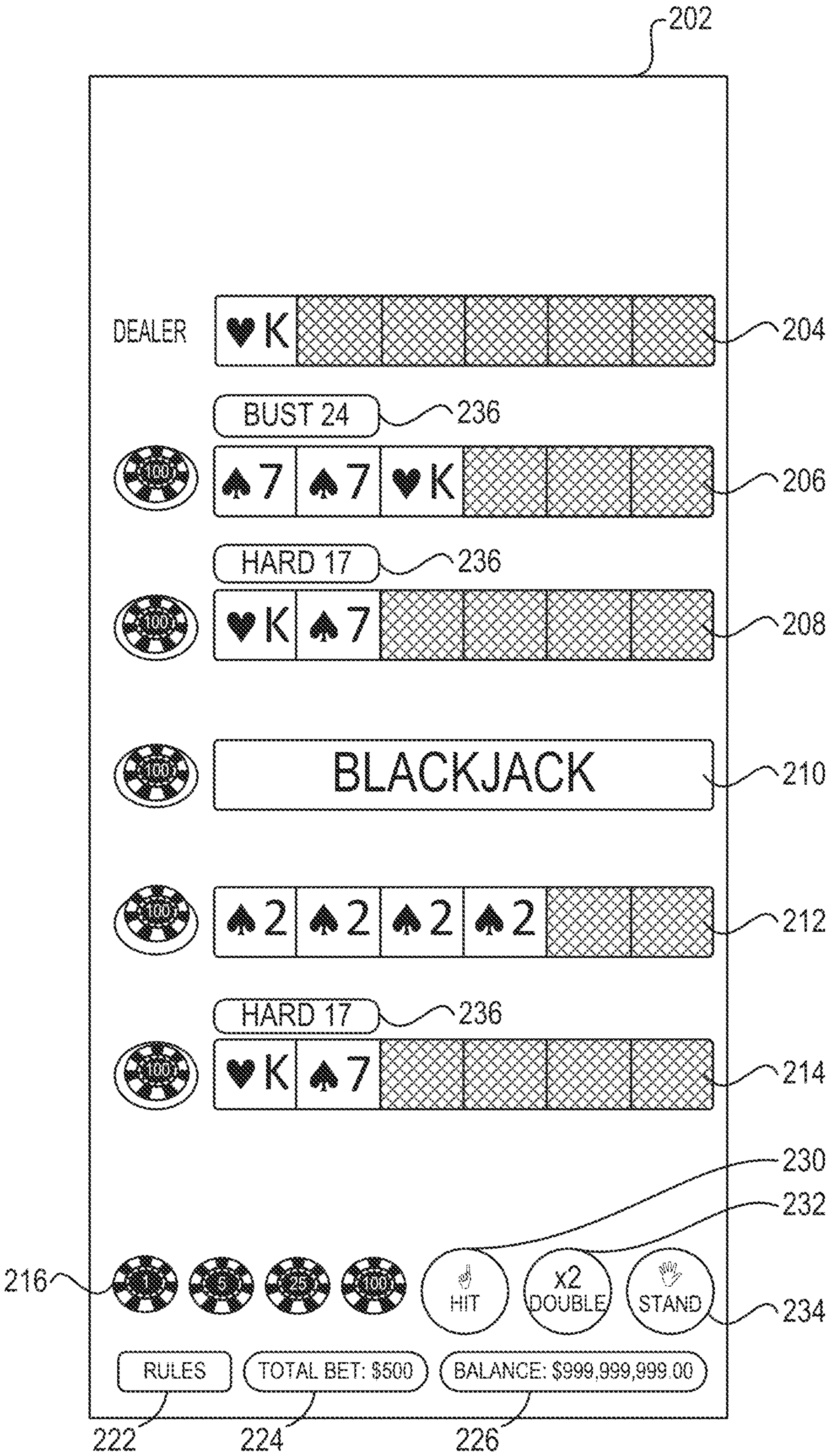
FIG. 2D illustrates a graphical user interface showing the hands of the multi-hand card game depicted in FIG. 2A, with one hand going bust, in accordance with one or more implementations.

Referring to FIG. 2D in the context of the components described in connection with FIGS. 1A and 1B, illustrated are the player card regions 206-214 on the graphical user interface 202 shown in FIG. 2B after two additional hit commands have been provided. As shown in FIG. 2D, the graphical user interface 202 has been updated to show additional cards to hands that satisfy the unlock condition (depicted in the player card regions 206 and 212). As shown, the player card region 212 is the only hand remaining unlocked. The graphical user interface 202 has been updated to include an indicator 236 above the player card region 206, which has a value that exceeds a threshold corresponding to a loss condition. In this example, the threshold for the loss condition is 21. As shown, the indicator 236 reflects that the hand has lost and the total value of the hand ("Bust 24"). Because the play includes at least one unlocked hand, the player is prompted to interact with the hit button 230, the double down button 232, or the stand button 235 to advance the play of the game.

Figure 2E:
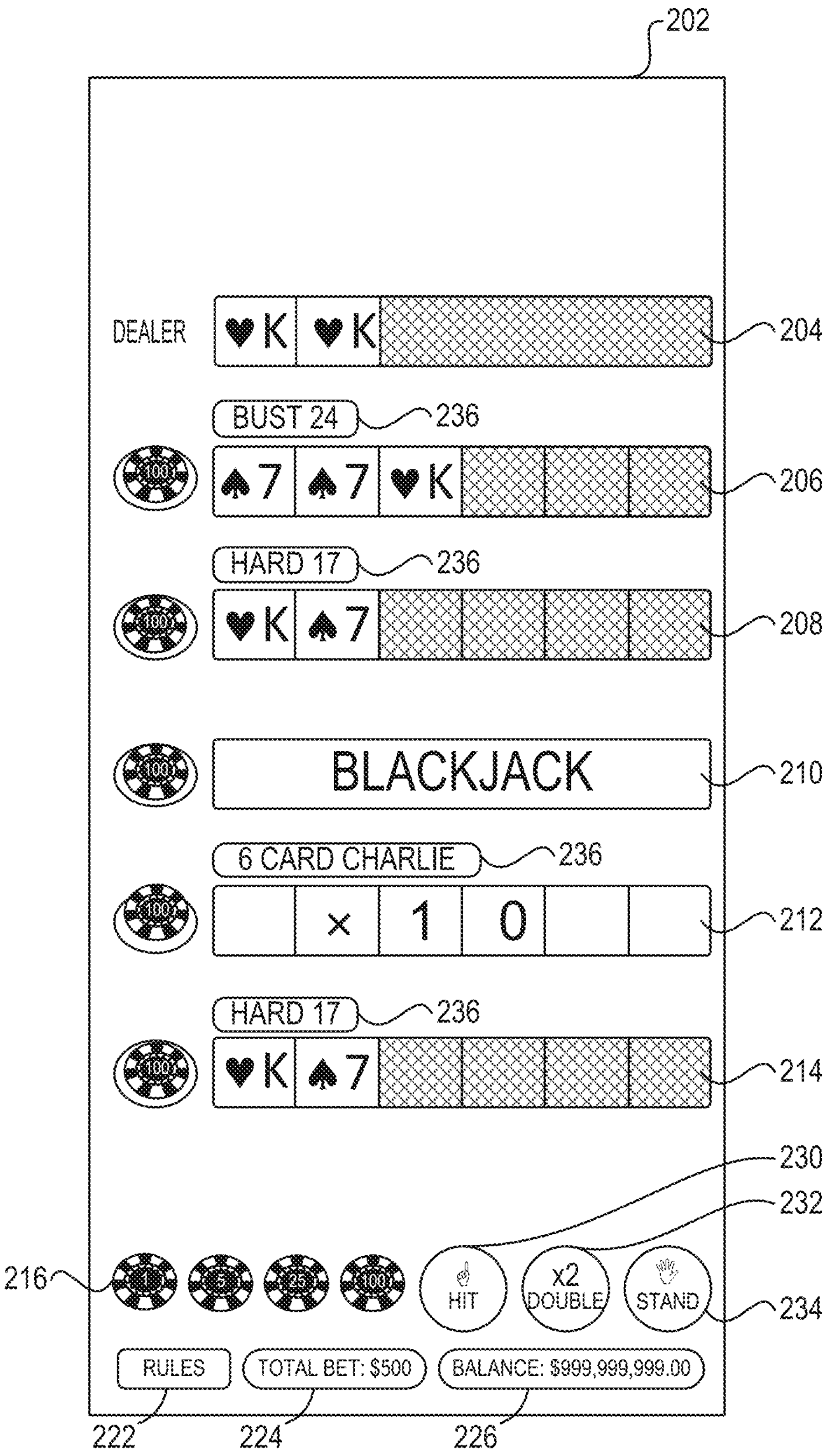
FIG. 2E illustrates a graphical user interface showing the hands of the multi-hand card game depicted in FIG. 2A, with one hand satisfying a Six-Card Charlie, in accordance with one or more implementations.

Referring to FIG. 2E, illustrated are the player card regions 206-214 depicted in FIG. 2D as part of the multi-hand card game following two additional hit commands provided by the player. Although not shown here, in this example, the two additional hit commands resulted in two additional cards having a face value of "2" being added to the hand corresponding to the player card region 212. As shown, the data processing system 105A has determined that the hand corresponding the player card region 212 has satisfied a bonus condition based on these additional cards. In this example, the bonus condition is satisfied by the player hand having six cards of the same value without exceeding the threshold corresponding to the loss condition. This type of bonus condition may be referred to as a "Six-Card Charlie". In this example, satisfying a Six-Card Charlie bonus condition results a winning outcome for the hand, and therefore the game state information 175 is updated to reflect that the corresponding hand is locked. The Six-Card Charlie may cause a bonus multiplier to be applied to the award amount for the corresponding hand. In this example, the award amount multiplier is a 10-times multiplier. As shown, the player hand region 212 is updated to show the bonus multiplier corresponding to the bonus condition. In some implementations, the graphical user interface 202 may be updated with a bonus indicator or notification showing the type of bonus condition which a corresponding hand satisfies.

Although this example has been described in connection with a Six-Card Charlie bonus condition, it should be understood that the data processing system 105A may determine that the player hands satisfy various other types bonus conditions, including but not limited to a Three of a Kind bonus condition, a Full House bonus, or a Royal Flush bonus condition, among others. As shown in FIG. 2E, each of the player card regions 206-214 satisfy the lock condition. Once all the player hands in the regions 206-214 are locked or the player chooses to hit the "stand" button, the data processing system 105A updates the dealer hand according to the game instructions 180.

In this example, the dealer hand region 204 has been updated to include a single additional card (e.g., in response to a dealer hit command generated by the data processing system 105A according to the game instructions 180). The additional card is a King card, causing the total value of the dealer hand to be equal to twenty. Because the total value of the dealer hand exceeds a threshold corresponding to a dealer lock condition (in this example, seventeen), which may be different from the lock condition evaluated for the player hands, the dealer hand is locked (e.g., by updating the game state information 175). After the dealer hand is indicated as locked in the game state information 175, the data processing system 105A updates the credit balance 226 based on a determined outcome for each player hand. In some implementations, each hand in the multi-hand card game is evaluated separately, allowing for different bonus conditions or outcomes for each individual hand. For example, in the player card region 210, a Blackjack condition is satisfied, and the region 210 is considered a winning outcome.

The data processing system 105A updates the player profile 170 to update the credit balance of the player with any award amounts or bonus award amounts. Additionally, the player profile 170 may be updated to include various metadata about the results of the game. For example, the updated player profile 170 can be updated to include any award amounts, bonus awards, the date and time of any game outcomes, identifiers of games played by the player, and any specific conditions that were satisfied or actions performed during the play of the game(s), among others.

In some implementations, partial payouts can be provided during the play of the game. For example, if a player places an insurance wager on one or more hands or for the play of the game, the credit balance of the player may be updated to award a partial payout if the dealer hand results in a Blackjack. In some implementations, the player may be given the opportunity to place a side wager on specific outcomes for the play of the game, such as the dealer having a Blackjack or the player obtaining a certain number of cards of a specific value. In some implementations, when the dealer initial hand is a Blackjack, the game terminates immediately with the dealer winning, and no other hands are played. This indicates that the graphical user interface 202 will not be updated with additional cards on the reels/card regions. In some implementations, if the dealer first card is an Ace, a player can consider an insurance/side bet for potential payouts. If the player wins a side bet, they are awarded a partial payout corresponding to a respective paytable that includes payouts for various side wager conditions. The provided examples are not exhaustive, and additional features and variations can be incorporated into the game design.

Although the foregoing examples have been described in the context of the data processing system 105A and a client device 120, it should be understood that similar techniques may be performed using the data processing system 105B of FIG. 1B, which may be implemented as a standalone gaming console, kiosk, or machine. For example, rather than providing instructions to update the graphical user interface at the client device 120, as in the foregoing examples, the data processing system 105B may display graphical user interfaces similar to those described in connection with FIGS. 2A-2E via the display device 185 and receive corresponding player interactions and wagers via the input device 160 and the wager receiver 165, respectively.

Figure 3:
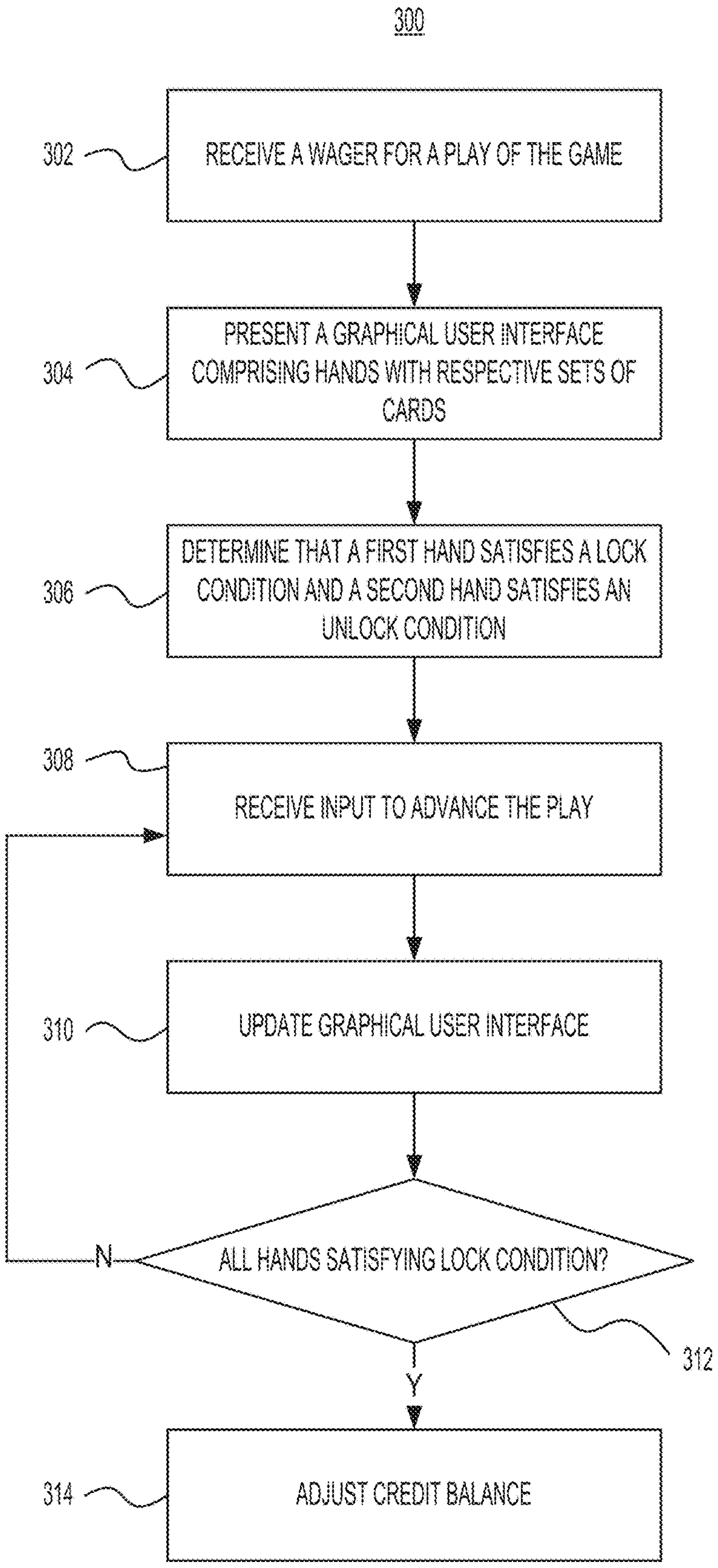
FIG. 3 illustrates an example flow diagram of a method for providing gaming system functionalities within a multi-hand card game, in accordance with one or more implementations.

Referring now to FIG. 3 in the context of the components described in connection with FIGS. 1A and 1B, depicted is an illustrative flow diagram of a method 300 for providing a multi-hand card game. The method 300 can be executed, performed, or otherwise carried out by a gaming server or a gaming system. A data processing system (e.g., the data processing system 105A, the data processing system 105B) can be remote to one or more client devices (e.g., the client device(s) 120) and communicate with the one or more client devices via a computer network. In some implementations, the operations of method 300 can be performed by a standalone gaming device (e.g., without communicating with a gaming server to perform the method steps, the data processing system 105B). In brief overview of the method 300, the data processing system 105A can receive a wager distributed across each hand of a plurality of hands for the play of the multi-hand card game (STEP 302), present a graphical user interface that includes a plurality of hands with respective sets of cards (STEP 304), determine if the first hand satisfies a lock condition and the second hand satisfies an unlock condition (STEP 306), receive input to advance the play (STEP 308), update the graphical user interface accordingly (STEP 310), evaluate if all the hands satisfy the lock condition (STEP 312), and adjust the credit balance if all the hands satisfy the lock condition (STEP 314).

In further detail of method 300, the data processing system can receive a wager for a play of a card game (STEP 302). The wager can be received in one or more messages received from a client device. The message, or request, can indicate that a player intends to play a game provided by the data processing system. The message can include an indication of a player profile to use to access the functionalities related to the game (e.g., placing wagers using earned credits, purchasing additional credits, etc.). The wager can be provided via a graphical user interface. In some implementations, the player can specify a single wager amount, which can be evenly distributed across each hand. In some implementations, the player can specify a different wager amount for each hand. The wager amounts provided can be a specified amount of credits, such as 1, 5, 25, 100, 500, or 1000 credits. In some implementations, the player can specify a custom number or fractional number of credits used in the game for each hand.

Once the wagers have been selected, the client device can transmit a request to place the wagers for the play of the game. The data processing system can then present a graphical user interface comprising a plurality of hands corresponding to the wager (STEP 304). In some implementations, the player can select the number of hands they want to play, and the graphical user interface can be updated accordingly. Each hand may include a respective first set of cards.

To determine which cards to present, the data processing system can randomly select cards from a virtual deck of cards (or multiple virtual decks of cads) using a randomized card selection technique to generate a number of hands for the player corresponding to the rules of the selected game. In the example implementation shown in FIGS. 2A-2E, the number of hands generated and provided to the player is five. However, the number of hands can be any number, as determined by the rules of the game or the player's preferences. After generating each hand for the player for the play of the game, the data processing system can provide a message (e.g., via a network communication) to the client device that includes data or instructions that cause the client device to present each card of the generated hands in the graphical user interface. In some implementations, the data processing system may generate a hand for a virtual adversary (e.g., a dealer in the example above), and transmit information indicating the visible portions of the hand (e.g., the face-up card in the case of multi-hand card game, etc.) to the player.

The data processing system can determine which hands that satisfy a lock condition and which hands an unlock condition (STEP 306). The lock condition and unlock condition can be predetermined conditions (e.g., specified in the game instructions 180) used to determine whether a hand is "locked," or cannot be updated to include any additional cards (or restricted from receiving any additional cards), or "unlocked" and therefore able to be updated to include at least one additional card. As described in connection with FIGS. 2B-2E, the lock condition can be satisfied when a hand has total value equal to or greater than a predetermined rank or value. In the example shown in FIG. 2B, this threshold value is 17. The predetermined threshold value can vary depending on the game rules or preferences. On the other hand, the unlock condition can be satisfied when a hand has a total value less than a predetermined rank or value. In the example shown in FIG. 2B, the unlock condition is satisfied when the hand has a total value of less than 17. However, the unlock condition can be satisfied at any predetermined value, as determined by the rules of the game or the player's preferences. For example, prior to initiating the play of the game, the player may provide, select, or otherwise indicate the threshold corresponding to the lock condition.

In a multi-hand card game, each card is assigned a numerical value, and the data processing system can calculate the total score for each player hand by summing the numerical values of the cards in the hand. The numerical value of a card may determine the card's rank and/or suit. Once the total score for a hand has been calculated, the data processing system can compare it to the threshold corresponding to the lock condition. Similarly, in some implementations, the threshold corresponding to the lock condition may be satisfied when a hand includes cards having a certain poker rank, such as a pair, three of a kind, or a full house, among others. If the total score for each initially dealt hand equals or exceeds the threshold corresponding to the lock condition (but does not equal or exceed a threshold corresponding or a loss condition), the data processing system can increment a counter to keep track of the number of hands that satisfy the threshold lock condition. The data processing system may update a game state (e.g., the game state information 175) to indicate that a respective hand satisfies the lock condition. Similarly, the data processing system can increment a counter to keep track of the number of hands that satisfy the unlock condition. The data processing system may update a game state to indicate that a respective hand satisfies the unlock condition. It should be noted that the lock and unlock conditions described here are only provided as examples, and different lock and unlock conditions can be defined for varying game requirements. For example, the data processing system may update the game state with an indication that a hand is locked if the cards in the hand satisfy a bonus condition (e.g., a Blackjack, a Six-Card Charlie, etc.). In some implementations, the data processing system may update the game state with an indication that a hand is locked if the total value of the cards in the hand equal or exceed a threshold corresponding to a loss condition (e.g., a "bust" in Blackjack).

In addition to the lock and unlock conditions, the data processing system can evaluate each player hand to determine each hand satisfies one or more bonus conditions. The bonus conditions can include, but are not limited to, Blackjack or Six-Card Charlie. Each bonus condition may correspond to a respective a bonus award amount or multiplier. For example, in some implementations, the bonus award payout for a Blackjack may be 3 to 2, meaning that the player can receive 3 units of their wager for every 2 units that they wagered. The bonus award payout amounts or multipliers may vary depending on the game rules (e.g., the game instructions 180). In some implementations, the data processing system can use a paytable to determine bonus award amounts or multipliers for different types of bonuses based on the cards included in each hand. In an example where bonus awards or multipliers are applied in response to a hand including cards satisfying different poker ranks, the paytable may specify that a player can receive a bonus payout if they have a pair of aces, a pair of kings, or a straight flush.

Once the number of hands that satisfy the lock condition, unlock condition, and bonus conditions are determined, the data processing system can receive input from the player to advance the play of the game (STEP 308). The player can be prompted to provide input by displaying the current game state on the graphical user interface. The player can select, for example, one or more actionable objects (e.g., buttons, hyperlinks, interactive user interface elements, etc.) to "hit," "double down," or "stand," in the case of the multi-hand card game. The hit command enables the player to draw an additional card for each unlocked hand. The double command doubles the player's wager for each hand and draws an additional card for each unlocked hand, and subsequently locks each unlocked hand after the additional card is presented. The stand command causes each hand to be locked, and for the game to conclude based on a generated dealer hand as described herein. Other in-game actions, which may be specified in game instructions for the game (e.g., the game instructions 180) are possible for other types of games, such as poker, rummy, or a dice game. The data processing system can also determine game termination conditions for each hand (e.g., if a hand satisfies a loss condition such as a bust).

Once the data processing system receives the input (e.g., "hit," "double down," or "stand") to advance the play, it can proceed to update the graphical user interface (STEP 310). The data processing system can carry out the corresponding actions based on the player's input. For example, in response to a hit command, the data processing system can update each of the unlocked hands to include an additional card, and display the additional cards in the graphical user interface as described herein. The numerical value of each additional card can then be added to the existing total value of each respective unlocked hand. The data processing system can then determine whether the additional card causes any hand to satisfy the lock condition or a bonus condition. To do so, the data processing system can identify each unlocked hand and determine a total score for the hand by summing each numerical value assigned to each card. The data processing system can then determine whether the total value of each unlocked hand is greater than or equal to the threshold corresponding to the lock condition. In some implementations, when the player provides a stand command (e.g., interacts with a stand button at the graphical user interface), the data processing system can directly proceed to STEP 314 to determine the outcome of each hand and adjust the credit balance accordingly.

The data processing system can determine whether each unlocked hand satisfies any other game condition, such as a bonus condition. One example of a bonus condition is a Six-Card Charlie condition, as described herein. The data processing system can determine whether the player's hand satisfies a predetermined threshold (such as 21, or any other predetermined value) and calculate the value of the hand to determine if it satisfies the specified condition. For example, to determine whether a hand satisfies a Blackjack bonus condition, the data processing system determines if a player's hand consists of an ace and a card with a value of 10. Other bonus conditions can be determined based on a bonus paytable or the poker rank of a hand. For example, a bonus paytable might specify that a player receives a bonus award payout or multiplier if a hand includes a specific combination of cards or poker rank, such as a royal flush.

The data processing system can determine whether all the hands satisfy the threshold lock condition or the bonus conditions in the graphical user interface (STEP 312). To do so, the data processing system can access the current game state and determine and identify any hands that are indicated as satisfying the unlock condition, as described herein. The data processing system can determine whether each hand satisfies the unlock condition or the lock condition based on the total value of the cards and the threshold corresponding to the lock condition, or criteria to satisfy different bonus conditions, as described herein. In some implementations, the data processing system can determine whether the counter (which is incremented whenever a hand satisfies the threshold corresponding to the lock condition) is equal to the total number of player hands. In some implementations, the data processing system can determine whether all of the hands are indicated in the game state as satisfying the lock condition. If the game state indicates that there are player hands that do not yet satisfy the lock condition, a termination condition, or a bonus condition, the data processing system can return to STEP 308 to receive further input to advance the play of the game. Otherwise, if there are no remaining unlocked hands, the data processing system can proceed to adjust the credit balance in STEP 314.

The credit balance can be adjusted by the data processing system according to the total award amount (STEP 314). To determine an amount by which to adjust the credit balance, the data processing system can determine an outcome for each hand. Prior to doing so, the data processing system may generate a hand for a dealer, as described herein, and update the graphical user interface to include the cards in the dealer hand. The dealer hand may be generated or updated according to the game instructions for the multi-hand card game. The credit balance may then be adjusted based on the outcomes determined for each hand. The data processing system can determine the outcome of each hand by comparing the total value of each hand to the total value of the dealer's hand. The value of each card is determined by its rank and/or suit. For example, a number card (2-10) is worth its face value, a face card (Jack, Queen, King) is worth 10 points, and an Ace can be worth 1 or 11 points. To calculate the total value of a hand, the values of all the cards in the hand are summed together. Once the total value of a hand is determined, the data processing system can determine the outcome for that hand by comparing its total value to the total value of the dealer's hand. For example, if a hand's total value is 22 or higher, it results in a bust and the player loses the hand. If a hand's total value is higher than the dealer's hand, it results in a win for the hand (e.g., the hand satisfies a win condition). If a hand's total value is less than the dealer's hand, it results in a loss (e.g., the hand satisfies a loss condition). In some implementations, if the total value of both the player's hand and the dealer's hand is 21, it is considered a push, resulting in a tie where the player neither wins nor loses their wager.

In addition, the data processing system can update the credit balance based on whether one or more hands satisfy one or more bonus conditions, as described herein. For example, a player might win a bonus if they get a pair of aces, Blackjack, or a Six-Card Charlie. In some implementations, the data processing system can use a bonus paytable to determine the amount of any bonus awards or multipliers that are won based on the total value or rank of the cards in each hand. The bonus paytable can typically list the different bonus conditions that can be satisfied, along with the amount of the bonus award that is associated with each condition.

The data processing system can determine the outcomes of each hand and the amount of any bonus awards that are won. The data processing system can adjust the credit balance in the player's player profile (e.g., a player profile 170). The amount of the adjustment may be based on the individual award amounts for each hand as well as any bonus awards that were won. In some implementations, the data processing system can increase the credit balance in the player profile by the sum of the bonus award amount and the award amount for each hand. If the bonus award condition is not met, resulting in a zero-bonus award amount, the data processing system can increase the credit balance solely by the award amounts for the winning hands. In some implementations, the credit balance is adjusted is based on the respective portion of the wager assigned to each hand that results in a winning hand. However, in implementations where the bonus award or multiplier is applied to a hand-specific wager before the completion of the game, the data processing system can update the credit balance in the player profile by adding the award amounts (including the application of any multipliers) for the winning hands before the play of the card game concludes. In some implementations, the credit balance may be updated after the play of the game concludes, and outcomes for all hands have been determined. Additionally, the data processing system can store additional metadata about the outcomes or actions performed during each play of the game, including but not limited to the award amount(s) won, along with corresponding timestamps indicating the time the award amount(s) were won.

Various operations described herein can be implemented on computer systems. FIG. 4 shows a simplified block diagram of a representative server system 400, client computer system 414, and network 426 usable to implement certain implementations of the present disclosure. In various implementations, server system 400 or similar systems can implement services or servers described herein or portions thereof. Client computer system 414 or similar systems can implement clients described herein. The system (e.g., the data processing system 105A) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some implementations, processing unit(s) 404 can include a general-purpose primary processor as well as one or more special-purpose co-processors such as graphics processors, digital signal processors, or the like. In some implementations, some or all processing units 404 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 406 can store one or more software programs to be executed by processing unit(s) 404, such as an operating system and/or programs implementing various server functions such as functions of the data processing systems 105A of FIG. 1A or any other system described herein, or any other server(s) associated with the data processing systems 105A, or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 802.3 standards) and/or wireless technologies (e.g., Wi-Fi, IEEE 802.11 standards).

In some implementations, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some implementations, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some implementations, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various implementations, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various implementations, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with implementations of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing multi-hand card games, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors coupled to non-transitory memory, the one or more processors configured to:
receive a wager corresponding to a play of a card game;
responsive to the wager, cause presentation of a graphical user interface comprising a plurality of hands for the play of the card game, each hand of the plurality of hands comprising a respective first set of cards;
determining, based on the respective first set of cards of each hand of the plurality of hands, that a first hand of the plurality of hands satisfies a lock condition, and that a second hand of the plurality of hands satisfies an unlock condition;
receive an input of a command to advance the play of the card game;
update the graphical user interface according to the command for each hand of the plurality of hands satisfying the unlock condition, wherein updating the graphical user interface causes animation of the graphical user interface to reveal a respective additional card for at least one of the plurality of hands satisfying the unlock condition; and
adjust a credit balance according to the plurality of hands and a dealer hand.

2. The system of claim 1, wherein the one or more processors are further configured to evenly distribute the wager across each hand of the plurality of hands.

3. The system of claim 1, wherein the one or more processors are further configured to determine that the first hand of the plurality of hands satisfies the lock condition responsive to a total value of the respective first set of cards of the first hand satisfying a threshold.

4. The system of claim 1, wherein the command to advance the play of the card game comprises a hit command or a double down command, and the one or more processors are further configured to update each hand of the plurality of hands that satisfies the unlock condition to include the respective additional card responsive to the hit command or the double down command.

5. The system of claim 4, wherein the one or more processors are further configured to determine that the second hand satisfies the lock condition responsive to updating the second hand.

6. The system of claim 4, wherein the one or more processors are further configured to restrict each hand of the plurality of hands that satisfies the lock condition from being updated to include the respective additional card.

7. The system of claim 1, wherein the command comprises a double down command, and wherein the one or more processors are further configured to:
responsive to the double down command:
double a respective portion of the wager assigned to each hand of the plurality of hands that satisfies the unlock condition; and
update each hand of the plurality of hands that satisfies the unlock condition to include the respective additional card.

8. The system of claim 1, wherein the one or more processors are further configured to:
determine that a total value of the respective first set of cards of at least one hand of the plurality of hands is equal to a predetermined threshold; and
adjust the credit balance further responsive to determining that the total value of the respective first set of cards of the at least one hand is equal to the predetermined threshold.

9. The system of claim 1, wherein the one or more processors are further configured to:
determine that at least one hand of the plurality of hands satisfies a bonus condition responsive to a number of cards in the at least one hand satisfying a predetermined number and a total value of the cards of the at least one hand not exceeding a predetermined threshold; and
adjust the credit balance further responsive to determining that the bonus condition is satisfied.

10. The system of claim 1, wherein the one or more processors are further configured to adjust the credit balance based on a respective portion of the wager assigned to each hand of the plurality of hands that satisfies a win condition of the play of the card game.

11. A method, comprising:
receiving, by one or more processors coupled to non-transitory memory, a wager corresponding to a play of a card game;
responsive to the wager, causing, by the one or more processors, presentation of a graphical user interface comprising a plurality of hands for the play of the card game, each hand of the plurality of hands comprising a respective first set of cards;
determining, by the one or more processors, based on the respective first set of cards of each hand of the plurality of hands, that a first hand of the plurality of hands satisfies a lock condition, and that a second hand of the plurality of hands satisfies an unlock condition;
receiving, by the one or more processors, an input of a command to advance the play of the card game;
updating, by the one or more processors, the graphical user interface according to the command for each unlocked hand of the plurality of hands, wherein updating the graphical user interface causes animation of the graphical user interface to reveal a respective additional card for at least one of the plurality of hands satisfying the unlock condition; and
adjusting, by the one or more processors, a credit balance according to the plurality of hands and a dealer hand.

12. The method of claim 11, further comprising evenly distributing, by the one or more processors, the wager across each hand of the plurality of hands.

13. The method of claim 11, further comprising determining, by the one or more processors, that the first hand of the plurality of hands satisfies the lock condition responsive to a total value of the respective first set of cards of the first hand satisfying a threshold.

14. The method of claim 11, wherein the command to advance the play of the card game comprises a hit command or a double down command, further comprising updating, by the one or more processors, each hand of the plurality of hands that satisfies the unlock condition to include the respective additional card responsive to the hit command or the double down command.

15. The method of claim 14, further comprising determining, by the one or more processors, that the second hand satisfies the lock condition responsive to updating the second hand.

16. The method of claim 14, further comprising restricting, by the one or more processors, each hand of the plurality of hands that satisfies the lock condition from being updated to include the respective additional card.

17. The method of claim 11, wherein the command comprises a double down command, further comprising:

responsive to the double down command:

doubling, by the one or more processors, a respective portion of the wager assigned to each hand of the plurality of hands that satisfies the unlock condition; and updating, by the one or more processors, each hand of the plurality of hands that satisfies the unlock condition to include the respective additional card.

18. The method of claim 11, further comprising:

determining, by the one or more processors, that a total value of the respective first set of cards of at least one hand of the plurality of hands is equal to a predetermined threshold; and adjusting, by the one or more processors, the credit balance further responsive to determining that the total value of the respective first set of cards of the at least one hand is equal to the predetermined threshold.

19. The method of claim 11, further comprising:

determining, by the one or more processors, that at least one hand of the plurality of hands satisfies a bonus condition responsive to a number of cards in the at least one hand satisfying a predetermined number and a total value of the cards of the at least one hand not exceeding a predetermined threshold; and adjusting, by the one or more processors, the credit balance further responsive to determining that the bonus condition is satisfied.

20. The method of claim 11, further comprising adjusting, by the one or more processors, the credit balance based on a respective portion of the wager assigned to each hand of the plurality of hands that satisfies a win condition of the play of the card game.

* * * * *